United States Patent
Schreier et al.

(10) Patent No.: US 11,521,272 B2
(45) Date of Patent: Dec. 6, 2022

(54) PARSING DATABASES TO GENERATE CUSTOMIZED RECOMMENDATIONS FOR HOME ASSESSMENT

(71) Applicant: Allstate Insurance Company, Northbrook, IL (US)

(72) Inventors: Elizabeth Schreier, Glenview, IL (US); Jamie Elizabeth Grahn, Lakemoor, IL (US); Tiffany Tillotson, Algonquin, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

(21) Appl. No.: 17/031,319

(22) Filed: Sep. 24, 2020

(65) Prior Publication Data
US 2021/0090179 A1    Mar. 25, 2021

Related U.S. Application Data

(63) Continuation of application No. 15/185,184, filed on Jun. 17, 2016, now Pat. No. 10,825,094.

(51) Int. Cl.
*G06Q 40/08*  (2012.01)
*G06Q 50/16*  (2012.01)

(52) U.S. Cl.
CPC .............. *G06Q 40/08* (2013.01); *G06Q 50/16* (2013.01)

(58) Field of Classification Search
USPC .......................................................... 705/4
See application file for complete search history.

(56) References Cited

U.S. PATENT DOCUMENTS

| 7,130,810 B2 | 10/2006 | Foster et al. |
| 7,389,246 B1 | 6/2008 | Ohrt |
| 8,229,767 B2 | 7/2012 | Birchall |

(Continued)

FOREIGN PATENT DOCUMENTS

WO    2001039090 A1    5/2001

OTHER PUBLICATIONS

"How a Pool Affects Your Homeowners Insurance", Value Penguin, http://www.valuepenguin.com/how-pool-affects-your-homeowners-insurance, printed Jun. 16, 2016, pp. 1-4.

(Continued)

*Primary Examiner* — William E Rankins
(74) *Attorney, Agent, or Firm* — Polsinelli PC

(57) ABSTRACT

Disclosed herein is a customized recommendation system for home assessment, in which the system comprises at least one or more databases, a computing device, and a device comprising hardware, including a processor and memory. The server device may receive a request for information on a home of a user from the computing device. The server device may identify publicly available information for the home and customer information comprising information about one or more features of the home and materials used in the home by parsing the one or more databases. By further analyzing the customer information and the publicly available information, the server device may determine one or more tips for the home and generate a customized recommendation including the one or more tips for the home. The server device may transmit the customized recommendation to the computing device associated with the user.

20 Claims, 5 Drawing Sheets

(56) References Cited

U.S. PATENT DOCUMENTS

| | | | |
|---|---|---|---|
| 8,271,299 B2 | 9/2012 | Davidson | |
| 8,275,640 B2 | 9/2012 | Jayaram et al. | |
| 8,442,921 B2 | 5/2013 | Wohlstadter et al. | |
| 8,527,306 B1* | 9/2013 | Reeser | G06Q 40/08 |
| | | | 705/4 |
| 8,650,048 B1 | 2/2014 | Hopkins, III et al. | |
| 8,719,134 B1 | 5/2014 | Huls et al. | |
| 8,719,135 B2 | 5/2014 | Oldham et al. | |
| 8,738,404 B1 | 5/2014 | Burns et al. | |
| 8,749,381 B1 | 6/2014 | Maroney et al. | |
| 8,817,959 B1* | 8/2014 | O'Hanlon | H04M 11/066 |
| | | | 379/93.24 |
| 10,091,144 B1* | 10/2018 | Nodine | G06F 16/24 |
| 2002/0059193 A1* | 5/2002 | Decime | G06Q 10/10 |
| 2002/0065896 A1* | 5/2002 | Burakoff | G06Q 40/00 |
| | | | 709/206 |
| 2002/0111846 A1* | 8/2002 | Singer | G06Q 10/109 |
| | | | 705/305 |
| 2002/0152169 A1 | 10/2002 | Dutta et al. | |
| 2003/0233323 A1 | 12/2003 | Bilski et al. | |
| 2004/0098279 A1 | 5/2004 | Frazier | |
| 2008/0187125 A1* | 8/2008 | Siegrist | H04M 7/003 |
| | | | 379/220.01 |
| 2009/0112634 A1 | 4/2009 | Koziol | |
| 2009/0164256 A1 | 6/2009 | Fisher et al. | |
| 2010/0042442 A1 | 2/2010 | Seitomer et al. | |
| 2011/0093299 A1* | 4/2011 | Stepeck | G06Q 40/08 |
| | | | 705/4 |
| 2011/0270773 A1* | 11/2011 | Siekman | G06Q 50/16 |
| | | | 705/305 |
| 2011/0282504 A1 | 11/2011 | Besore et al. | |
| 2012/0010909 A1 | 1/2012 | Corell | |
| 2012/0179727 A1 | 7/2012 | Esser | |
| 2012/0215614 A1 | 8/2012 | Hochstatter et al. | |
| 2012/0246702 A1 | 9/2012 | Shepler et al. | |
| 2012/0260211 A1* | 10/2012 | Sathish | G06Q 30/0269 |
| | | | 715/784 |
| 2012/0284124 A1 | 11/2012 | Harangozo et al. | |
| 2013/0325730 A1 | 12/2013 | Ruddy et al. | |
| 2014/0257864 A1 | 9/2014 | Billman | |
| 2014/0372150 A1 | 12/2014 | Karie et al. | |
| 2015/0088556 A1 | 3/2015 | Convery et al. | |
| 2015/0199765 A1 | 7/2015 | Noonan | |
| 2015/0339780 A1 | 11/2015 | Collopy et al. | |
| 2016/0019707 A1* | 1/2016 | Barman | G06F 16/4393 |
| | | | 715/202 |
| 2017/0322705 A1* | 11/2017 | Conway | G06F 3/04842 |
| 2022/0044238 A1* | 2/2022 | Jones | G06Q 20/204 |

OTHER PUBLICATIONS

"How Insurance Companies Determine Home Insurance Premiums", Free Advice Insurance, https://insurance.freeadvice.com/information/home/article/44, printed Jun. 16, 2016, pp. 1-5.

"If Disaster Strikes Will You Be Covered?," The Actuarial Foundation, 2015 by Federal Alliance for Safe Homes, Inc., pp. 1-40.

Aug. 22, 2017 (WO) International Search Report and Written Opinion—App. PCT/US2017/037873.

Oct. 25, 2018—(US) Non-Final Office Action—U.S. Appl. No. 15/185,184.

Mar. 28, 2019—(US) Final Office Action—U.S. Appl. No. 15/185,184.

Sep. 16, 2019—(US) Non-Final Office Action—U.S. Appl. No. 15/185,184.

Mar. 6, 2020—(US) Final Office Action—U.S. Appl. No. 15/185,184.

Jun. 24, 2020—(US) Notice of Allowance—U.S. Appl. No. 15/185,184.

* cited by examiner

PARSING DATABASES TO GENERATE CUSTOMIZED RECOMMENDATIONS FOR HOME ASSESSMENT

CROSS-REFERENCE TO RELATED APPLICATIONS

This application is a continuation of and claims priority to U.S. patent application Ser. No. 15/185,184, filed Jun. 17, 2016, and entitled "Parsing Databases to Generate Customized Recommendations for Home Assessment," which is incorporated herein, by reference, in its entirety.

BACKGROUND

A home or structure often includes various structural features, appliances, and the like, that may necessitate repair, replacement, and maintenance over the years. Given that a person's home is often one of his or her most valuable assets, it may be important to evaluate the condition of the home in general, as well as particular structural features, appliances, or the like, in order to ensure that proper maintenance is being performed, issues are addressed early, and the like.

Insurance companies or providers may offer home insurance to homeowners to cover costs and protect homes from damage during unexpected disasters. Home insurance may allow customers to lower costs associated with repairing, replacing, or renovating one or more features of a home. For example, insurance providers may cover weather-related damage to a home, such as hail damage, tornado damage, earthquake damage, hurricane damage, and damage associated with other catastrophes.

There may be a demand for new systems, methods, and devices for automatically providing customers with recommendations and facilitating home assessments in an improved manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing customized recommendations for home assessment to users. The recommendation system may utilize various information sources to identify useful tips and recommendations for a user regarding his or her home. For example, a customized recommendation system may utilize data that is available to the public, as well as customer-specific data, to determine customized tips or incentives for maintaining a user's home.

The disclosure describes a system comprising a first database storing publicly available information, a second database storing customer information, a first computing device associated with a user, and a server computer comprising hardware including a processor and memory. The server computer may be configured to receive, from the first computing device, a request for information on a home of the user, identify publicly available information for the home by parsing the first database, identify customer information comprising information about one or more features of the home and materials used in the home by parsing the second database, determine one or more tips or recommendations for the home based on analyzing the customer information and the publicly available information, generate a customized recommendation for the user including the one or more tips for the home, and transmit the customized recommendation to the first computing device associated with the user.

The disclosure also describes an apparatus comprising at least one processor, a network interface configured to communicate, via a network, with a first computing device associated with a user, a first database, and a second database, and a memory storing computer-readable instructions that, when executed by the at least one processor, cause the apparatus to receive, from the first computing device, a request for information on a home of the user, identify publicly available information for the home by parsing the first database, identify customer information comprising information about one or more features of the home and materials used in the home by parsing the second database, determine one or more tips for the home based on analyzing the customer information and the publicly available information, generate a customized recommendation for the user including the one or more tips for the home, and transmit the customized recommendation to the first computing device associated with the user.

In addition, aspects of this disclosure provide a method that includes receiving, from a first computing device associated with a user, a request for information on a home of the user, accessing, by one or more computing devices, publicly available information for the home, wherein the publicly available information is stored in one or more databases, based on the request for information on the home, identifying, by the one or more computing devices, customer information comprising information about one or more features of the home and materials used in the home, determining, by the one or more computing devices, one or more tips for the home based on analyzing the customer information and the publicly available information, generating, by the one or more computing devices, a customized recommendation for the user including the one or more tips for the home, and transmitting, by the one or more computing devices, the customized recommendation to the first computing device associated with the user.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
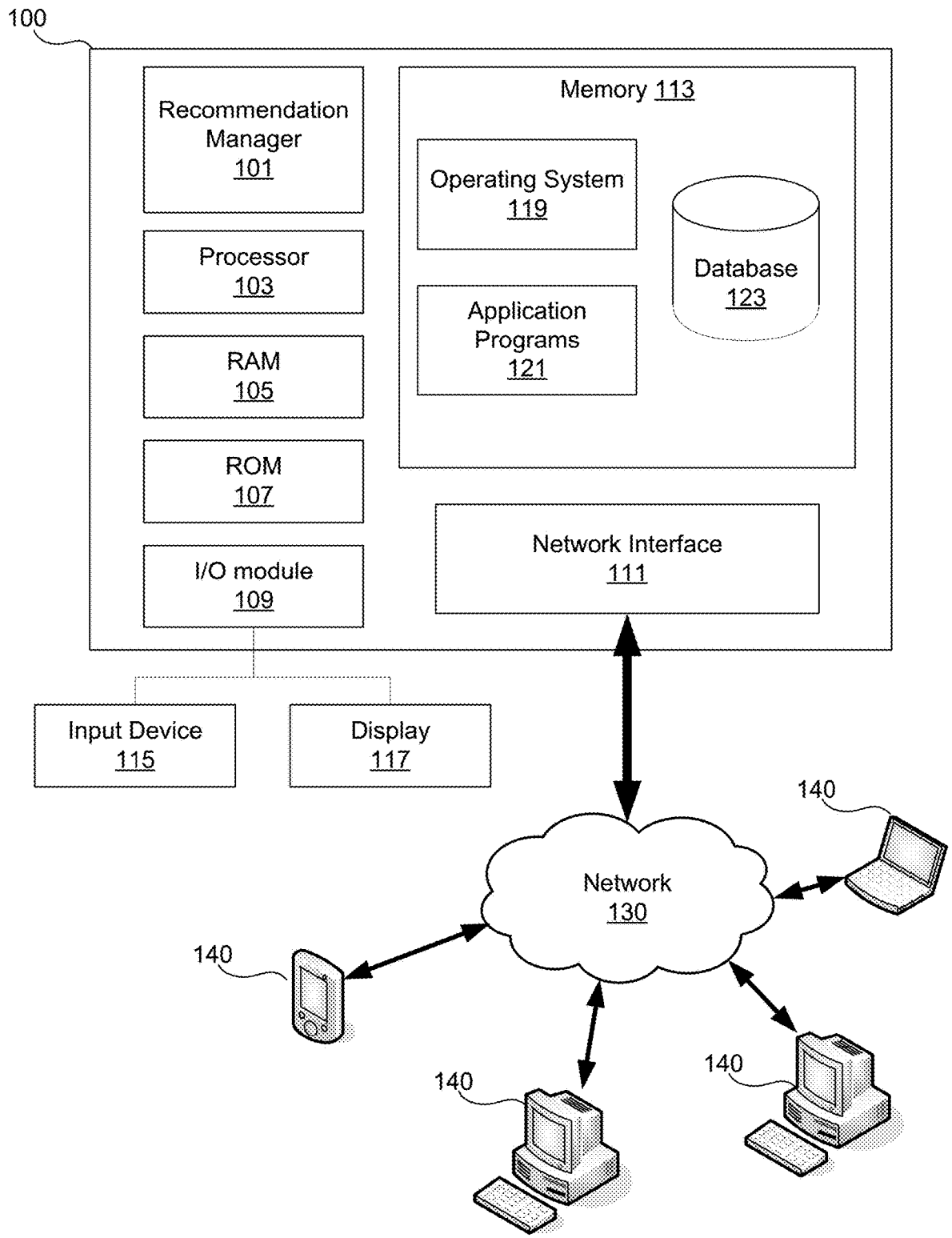
FIG. 1 depicts a block diagram of an example recommendation device that may be used in accordance with one or more example embodiments.

In accordance with various aspects of the disclosure, computerized methods, systems, devices, and apparatuses are disclosed that provide recommendations to users regarding home insurance and home assessment. In particular, the present disclosure teaches a customized recommendation system that may identify publicly available information and customer-specific information in order to provide recommendations regarding facts, potential risks, and helpful tips to users regarding their homes. In some embodiments, the recommendation system may be utilized by, for instance, an insurance provider that offers home insurance to users (e.g., insurance policy holders). For example, a user may be insured by the insurance provider for home insurance and may have a registered account in which the user may have opted in for customized recommendations. In other cases, a user might not have an insurance policy with the insurance provider. The recommendation system may allow the insurance provider to pique the interests of future customers, while also providing incentives to users to purchase insurance policies.

The recommendation system may employ publicly available information or data, which may include locality information, such as information about the location or neighborhood in which a home is located, including weather information, insurance claim history (e.g., most common insurance claims and most costly insurance claims), local crime statistics, cost of living information, energy and cost savings information, market value information, and the like. In some embodiments, the recommendation system may access this public information which may be stored in one or more databases, in compiled public records, or by one or more application programming interfaces (APIs) utilized by the recommendation system.

Customer information may include information regarding specific properties or features of each customer's home, as well as information regarding the types of materials used in each customer's home. For example, customer information may indicate features such as what type of siding is used in a home, type of roof material or shingles, whether a customer owns a pool, whether a customer has a deck in his or her home, and the like. One or more features of a customer's home may be related to at least one of a pool, deck, balcony, terrace, patio, porch, garage, exterior additions, type of siding, type of roof, lights, floors, water pipes, heater, air conditioner, HVAC system, alarm system, basement, fireplace, and refrigerator.

Based on parsing and analyzing the publicly available information and the customer information, the recommendation system may determine one or more tips for a customer's home that are tailored to the specific features in the customer's home and generate a customized recommendation for the customer. For example, the recommendation system may identify that the customer has a certain type of home (e.g., a row house, a condominium unit, a loft, a duplex, or any other structure) and may offer tips that are specific to the type of home. In some cases, the one or more tips for the home may be related to at least one of maintenance, renovation, part replacement, cost savings, and energy efficient savings for one or more features of the home.

The recommendation system may also identify a year that a customer's home was built and provide one or more recommendations or tips for maintaining the home based on an age of the structure. For example, the recommendation system may identify that a customer's home is over 20 years old and may recommend replacing a hot water heater, painting an exterior of the structure, replacing a roof, upgrading to energy efficient appliances, or the like. In some embodiments, the recommendation system may utilize and cross-reference an age of a home with weather information in order to identify one or more recommendations or tips that may be beneficial for a customer maintaining his or her home in varying weather conditions.

In additional embodiments, the recommendation system may identify a location of a customer's home, as well as weather and insurance claim history information in the local area of the home, and provide corresponding recommendations and tips to the customer. For example, different climates in an area may have adverse effects on the customer's home structure, such as the siding on a home. The recommendation system may recommend that the customer replace the siding in his or her home or recommend that the customer purchase a different type of siding that is appropriate for the weather in the area of the home.

In addition to providing tips, the recommendation system may identify an insurance agent who is available to assist a user with home insurance or maintenance issues. For example, the user may have questions about his or her home and may wish to speak with a representative for assistance. The recommendation system may identify an available insurance agent based on the location of the home, the location of the user, and the like. For example, the recommendation system may identify local agents who are familiar with the area in which the user is interested, and the local agents may provide information to the user accordingly. In some cases, if a user is a customer, the user may access the recommendation tool by clicking on a uniform record locator (URL) address in an email that passes agent information to the user (e.g., in which the URL address passes one or more parameters). The user may then contact his or her insurance agent for more information by using the agent information provided in the email.

Ultimately, the recommendation system may provide at least one of incentives and tips to customers for insuring and maintaining their homes. The recommendation system may also provide incentives or deals for specific products that are of interest to customers based on the specific properties and features of each customer's home.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example recommendation device 100 that may be used in accordance with aspects of the present disclosure. The recommendation device 100 is a specialized computing device programmed and/or configured to perform and carry out aspects associated with providing home insurance and home assessment recommendations to users as described herein. The recommendation device 100 may have a recommendation manager 101 configured to perform methods and execute instructions as described herein. The recommendation manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the recommendation manager 101 may refer to the software (e.g., a computer program or application) and/or hardware used to receive a request for information on a home of a user, access publicly available information for the home, identify customer information comprising information about one or more features of the home and materials used in the home, analyze the customer information and the publicly available information, determine one or more tips for the home based on the analysis, generate a customized recommendation for the user including the one or more tips for the home, and notify the user of the customized recommendation. Specifically, the recommendation manager 101 may be a part of an insurance system that assesses customer information and locality information in order to determine recommendations for each customer's home and provide insurance and maintenance tips to each customer. The one or more specially configured processors of the recommendation manager 101 may operate in addition to or in conjunction with another general processor 103 of the recommendation device 100. In some embodiments, the recommendation manager 101 may be a software module executed by one or more general processors 103. Both the recommendation manager 101 and the general processor 103 may be capable of controlling operations of the recommendation device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a customer associated with the recommendation device 100 may provide input data. The I/O module 109 may also be configured to be connected to a display device 117, such as a monitor, television, touchscreen, and the like, and may include a graphics card. The display device 117 and input device 115 are shown as separate elements from the recommendation device 100, however, they may be within the same structure.

Using the input device 115, system administrators may update various aspects of the customized recommendation system, such as rules, predefined threshold values, predetermined ranges, and/or information related to identifying publicly available information for a home, identifying customer information regarding one or more features and materials of the home, determining one or more tips for the home regarding maintenance or costs savings, and generating customized recommendations including the one or more tips. For example, system administrators may use the input device 115 to update one or more predetermined ranges for accessing publicly available information and parsing the information to identify which subset of information is relevant to a particular home (e.g., based on a location of the home). On some rating devices 100, the input device 115 may be operated by a user (e.g., customer) to interact with the recommendation system, including at least one of submitting a user request for information on a home, receiving or submitting customer information and location information of a home, and requesting and/or receiving one or more tips in a customized recommendation for a home, as described herein.

The memory 113 may be any computer readable medium for storing computer executable instructions (e.g., software). The instructions stored within memory 113 may enable the recommendation device 100 to perform various functions. For example, memory 113 may store software used by the recommendation device 100, such as an operating system 119 and application programs 121, and may include an associated database 123.

The network interface 111 allows the recommendation device 100 to connect to and communicate with a network 130. The network 130 may be any type of network, including a local area network (LAN) and/or a wide area network (WAN), such as the Internet. Through the network 130, the recommendation device 100 may communicate with one or more computing devices 140, such as laptops, notebooks, smartphones, personal computers, servers, and the like. The computing devices 140 may include at least some of the same components as recommendation device 100. In some embodiments the recommendation device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a recommendation device 100. In other embodiments, the recommendation device 100 may include fewer or more elements. For example, the recommendation device 100 may use the general processor(s) 103 to perform functions of the recommendation manager 101, and thus, might not include a separate processor or hardware for the recommendation manager 101. Additionally, or alternatively, the recommendation device 100 may be a mobile device (e.g., a smartphone, tablet, and the like) specially configured to perform or carry out aspects of the recommendation service described herein, and thus, may also include various other components, such as a battery, speaker, and/or antennas (not shown).

Figure 2:
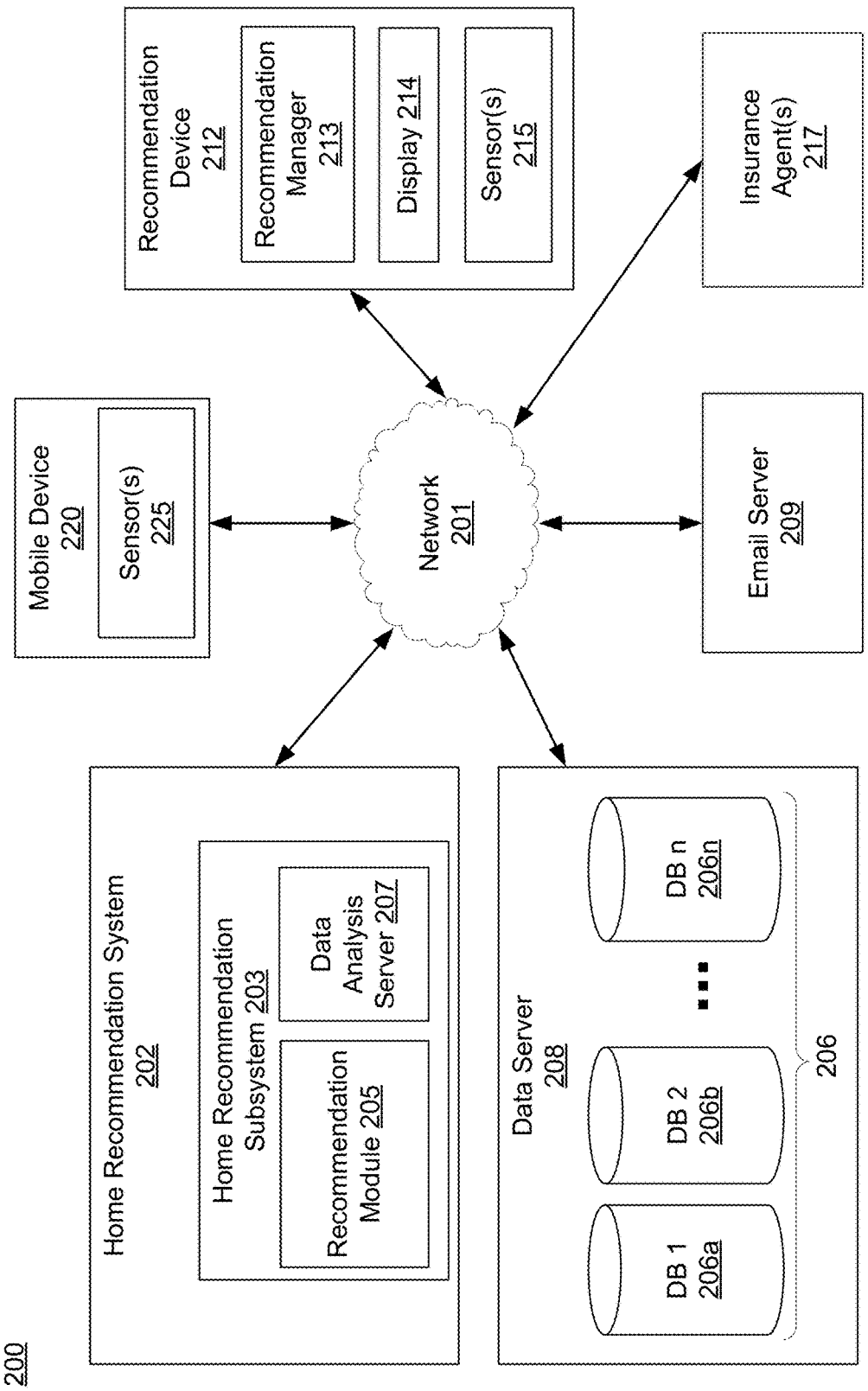
FIG. 2 depicts an example network environment in which various aspects of the present disclosure may be implemented in accordance with one or more example embodiments.

The computerized methods for providing customized recommendations for home insurance and home assessment features and notifying customers of recommendations as disclosed herein may be implemented on one or more recommendation devices 100 used in various network environments. FIG. 2 illustrates an example network environment 200 for implementing methods in accordance with aspects of the present disclosure.

As shown in FIG. 2, the network environment 200 may include a network 201 configured to connect a home recommendation system 202, recommendation device 212, a computing device associated with an insurance agent 217, and/or a mobile device 220. The recommendation device 212 may be the same as or at least similar to the recommendation device 100 described above with reference to FIG. 1. Collectively, these specialized computing devices may form at least a part of a home assessment and recommendation system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers.

Accordingly, for example, a mobile device 220 (e.g., a smartphone, flip-phone, tablet, and the like) or a recommendation device 212 of a user or customer may communicate, via a cellular backhaul of the network 201, with a home recommendation system 202 to submit a request for information on a home as a part of the customized recommendation service. For example, the mobile device 220 or recommendation device 212 may request for the recommendation system 202 to provide a customized recommendation of one or more helpful tips for maintenance of a home. In another example, the mobile device 220 or the recommendation device 212 of the user or customer may communicate, via the cellular backhaul of the network 201, with the recommendation system 202 to submit customer information and/or home information for the recommendation service.

And in the opposite direction, the home recommendation system 202 may communicate, via the cellular backhaul of the network 201, with the mobile device 220 or the recommendation device 212 to notify the user of the mobile device 220 or recommendation device 212 of customized recommendations determined based on publicly available information and customer information, insurance recommendations and incentives for a home, and the like. In another embodiment, the mobile device 220 and/or recommendation device 212 may communicate back and forth with the recommendation system 202 over the Internet, such as through a web portal.

Although FIG. 2 illustrates only one recommendation device 212 and one mobile device 220, the recommendation system may be configured to communicate with multiple recommendation devices 212 and mobile devices 220 simultaneously (e.g., at or around the same time), and the multiple recommendation devices 212 and mobile devices 220 may be associated with multiple individuals. The recommendation system 202 may receive requests for information on homes for respective users of multiple recommendation devices simultaneously, access publicly available information for each home of respective users simultaneously, identify customer information regarding one or more features of each home of respective users simultaneously, determine one or more tips for each home simultaneously, generate customized recommendations for respective users simultaneously, and notify each user of respective customized recommendations simultaneously.

In some embodiments, there may be one or more users or customers associated with a home. For example, a user may be associated with a home if he or she owns the home or if he or she is identified on an insurance policy that insures the home. In some embodiments, a user associated with the home may be uninsured or an insurance policy holder. A user may interact with and operate a recommendation device 212 to access the recommendation system 202. In some embodiments, the recommendation device 212 may be a specialized mobile device (e.g., mobile phone), a tablet, laptop, personal computer, and the like configured to perform or carry out aspects associated with customized recommendations as described herein. For example, the recommendation device 212 may be the same (e.g., integrated with, include substantially the same components and provide substantially the same functionality, or the like) as the mobile device 220 depicted in FIG. 2. The recommendation device 212 may belong to a customer of an insurance provider who is a part of a recommendation service provided by the insurance provider. In some cases, the recommendation device 212 may be at an insurance provider, and data may be transmitted between the customer and the device 212.

Although only one recommendation device 212 is illustrated in FIG. 2, there may be any number of recommendation devices 212, wherein each recommendation device 212 is associated with at least one customer. The recommendation device 212 may further comprise a recommendation manager 213, a display 214, and sensors 215.

The recommendation device 212 may be configured to execute the recommendation manager 213 that presents a user interface (e.g., a graphical user interface for a website, application, software program, and the like) on the display 214. The display 214 may comprise a monitor, television, touchscreen, and the like. The user interface of the recommendation manager 213 may allow users to send requests for information on a home, receive customized recommendations, tips, and incentives, sign up for and receive notifications from an insurance provider (e.g., for maintenance reminders), and communicate with an insurance agent regarding services provided by the recommendation system 202.

The recommendation manager 213 may be a self-sufficient program or may be a module of another program, such as a program used to collect and/or evaluate customer information utilized by the home recommendation system 202. The recommendation manager 213 may have access to data (e.g., publicly available information, customer information, and the like) that is collected and stored by the recommendation system 202. For example, the recommendation manager 213 may use this collected data to determine one or more tips for homes and provide recommendations to users accordingly. In some embodiments, the recommendation manager 213 may be configured in a similar manner as the recommendation manager 101 or configured to perform similar functions as those performed by the recommendation manager 101.

In some embodiments, the recommendation manager 213 may be downloaded or otherwise installed onto the recommendation device 212 using known methods. Different devices may install different versions of the recommendation manager 213 depending on their platform. A user may launch the recommendation manager 213 by, for example, operating buttons or a touchscreen on the recommendation device 212. Additionally, or alternatively, the recommendation device 212 may be configured to execute a web browser (e.g., an application for accessing and navigating the Internet) to access a web page providing an interface for the recommendation system. In some embodiments, the recommendation device 212 may also be configured to collect information, such as customer information. For example, the recommendation manager 213 or another program installed on the recommendation device 212 may instruct the recommendation device 212 to collect customer data, such as a location of the customer, using the sensors 215, which may include a GPS, or by using other location-based services.

The recommendation manager 213 or another program installed on the recommendation device 212 may identify a location of the customer and may further identify a location of the customer's home. For example, the customer may request information for his or her home, and the recommendation manager 213 may automatically identify the customer's home location based on the location of the customer using GPS coordinates indicating the geographical location of the recommendation device 212 and/or mobile device 220. After identifying the location of the home, the recommendation manager 213 may communicate with the home recommendation system 202 to access stored data and obtain a recommendation that is the customized for the user.

FIG. 2 also illustrates a mobile device 220 which may be any mobile device associated with a user or customer associated with a home. In particular, the mobile device 220 may belong to a customer of an insurance provider, in which the customer is enrolled in a service that allows the customer to participate in and receive recommendation services. Mobile device 220 may be, for example, a smartphone or other mobile phone, personal digital assistant (PDA), tablet computer, and the like, and may include some or all of the elements described above with respect to the recommendation manager 101. In some cases, the mobile device 220 may be configured similarly to the recommendation device 212 and may interface or communicate with the recommendation system 202 via a wireless connection (e.g., 3G, 4G LTE, Wi-Fi or other) over the network 201.

The mobile device 220 and/or recommendation device 212 may also communicate with a computing device associated with an insurance agent 217. In some cases, the computing device associated with the insurance agent 217 may be referred to as an employee computing device 217. The computing device 217 may be any computing device used by an employee (e.g., insurance agent, system administrator, and the like) of an insurance provider to access the recommendation system 202. For example, an insurance agent may use the computing device 217 to communicate with a user of the mobile device 220 or recommendation device 212 through the recommendation system 202. In another example, the computing device 217 may be configured to transmit emails, messages, and/or notifications (e.g., using an email server 209) to communicate with a customer on behalf of an insurance agent.

The insurance agent may use the computing device 217 to provide assistance, home insurance, and maintenance information to users, including information regarding deals, incentives, and the like. For example, the computing device 217 may transmit information regarding deals and incentives for specific products that may be of interest to a user based on the user's home information. In some cases, an insurance company may be partnered with one or more third-party vendors that may sell products or services (e.g., HVAC systems maintenance, water heaters maintenance, electrical systems maintenance, home security systems, window installation and/or repair, smoke detectors, and the like) that may be of interest to users for renovating or maintaining their home. The computing device 217 may provide users with contact information for relevant third-party vendors on behalf of the insurance agent, and users may personally contact vendors of interest by utilizing the provided information from the computing device 217.

In some embodiments, a user of the mobile device 220 or recommendation device 212 may be able to communicate with an insurance agent at the computing device 217 by accessing the recommendation manager 213, and the computing device 217 may have access to customer information, account information, billing information, insurance coverage information, third party vendor information, and the like (e.g., through the recommendation system 202).

FIG. 2 also illustrates a data server 208 and an email server 209 within the network environment 200. The data server 208 may represent computer hardware and software, including a plurality of databases 206, along with computing systems and software tools for analysis and management of data stored therein. In some cases, the data server 208 may represent a data warehouse or repository comprising the plurality of databases of 206. In some embodiments, the plurality of databases 206 may be incorporated into the data server 208 or may be separate components in the data server 208. As an example, the plurality of databases 206 (e.g., databases 206a-206n) may comprise a customer information database, locality information database, publicly available information database, insurance policy database, and other databases. One or more of the databases 206a-206n may comprise customer information, including information about one or more features of each customer's home and the types of materials used in each customer's home. For example, the one or more databases 206a-206n may store information regarding a pool, deck, balcony, terrace, patio, porch, garage, exterior additions, type of siding, type of roof, lights, floors, water pipes, heater, air conditioner, HVAC system, refrigerator, alarm system, basement, fireplace, and other appliances or features in a customer's home.

The one or more databases 206a-206n may also store publicly available information, which may include one or more records of information regarding a location or neighborhood in which each customer's home is located, weather information, insurance claim history information, local crime statistics, cost of living information, energy information, market value information, and the like. For example, publicly available information may include information about the most common insurance claims and the most costly insurance claims in a local area. In some cases, the one or more databases 206a-206n may further store one or more records of historical costs and statistics regarding a type of damage that is most prevalent for homes in varying local areas. The data server 208 may also parse identifiers in the fields of the one or more records (e.g., in the one or more databases 206) to identify information corresponding to each customer.

The data stored in the plurality of databases 206a-206n may be collected, compiled, and/or parsed by the recommendation device 212, the computing device 217, the home recommendation subsystem 203, the data analysis server 207, the data server 208, the email server 209, or by servers and subsystems within the home recommendation subsystem 203. In additional embodiments, the data server 208 may also interface with one or more application programming interfaces (APIs) which may provide weather information, public information, and locality information for home recommendations.

Furthermore, the email server 209 may access the data server 208, including contents of the one or more databases 206. The email server 209 may represent one or more servers, computing devices, and/or computing platforms utilized to design and generate customized communications to users based on data obtained from the data server 208. In some embodiments, the email server 209 may generate customer communication emails to pass data to the home recommendation system 202. For example, the email server 209 may generate a plurality of emails, in which each email passes a uniform record locator (URL) address to customer data and insurance agent data to the home recommendation system 202. The URL address may pass one or more parameters or variables corresponding to the customer data. The home recommendation system 202 may obtain and accept the customer data (e.g., including information about one or more features of each customer's home and the types of materials used in each customer's home) via the URL address received from the email server 209. The home recommendation system 202 may then match one or more parameters from the URL address to data in a database of variables. In some cases, the home recommendation system 202 may match data by using a data lookup table in order to determine which recommendations are appropriate to display for each specific customer.

FIG. 2 further illustrates example subsystems within the network environment 200. That is the home recommendation system 202 may comprise a home recommendation subsystem 203. The home recommendation subsystem 203 may include one or more application servers, computing devices, and other equipment (e.g., conference bridge equipment) used by company (e.g., insurance company) personnel to implement and provide the recommendation services described herein.

The home recommendation subsystem 203 may include functionality that may be distributed among a plurality of computing devices. For example, the home recommendation subsystem 203 may comprise further subsystems, including client-side subsystems and server-side subsystems. The client-side subsystem may interface with the recommendation device 212, computing device 217, and/or mobile device 220, whereas the server-side subsystem may interface with application servers and computing devices, including data server 208 and email server 209, which handle a variety of tasks related to parsing and identifying customer information comprising information about one or more features of a user's home and materials used in the home, generating emails based on the customer information including URL addresses to the data, matching one or more parameters from the URL with a data lookup table or a database of variables, determining one or more tips for the home based on the matching, and generating customized recommendations for the user based on the one or more tips, as well as the overall management of the recommendation services. For example, the home recommendation subsystem 203 may include one or more servers, such as a data analysis server 207. In some embodiments, the data analysis server 207 may be the same as or at least similar to the data server 208. The data analysis server 207 may be configured to perform aspects of home assessment, parsing and data analysis, and recommendation services as described herein. For example, the data analysis server 207 may identify a user based on a request for information on a home received from the recommendation device 212 or mobile device 220. Based on the request, the data analysis server 207 may access publicly available information and customer information and parse the information to identify a subset of information that corresponds to a customer. The data analysis server 207 may further parse and analyze the subset of information corresponding to the customer by using one or more predefined algorithms.

The home recommendation subsystem 203 may also include a recommendation module 205 that may include hardware and/or software configured with programmed instructions to determine one or more tips for a user's home and generate customized recommendations for the user. The data analysis server 207 may interface and communicate with the recommendation module 205 to provide analyzed information to the module. In some embodiments, the data analysis server 207 may utilize one or more predefined algorithms to determine a subset of data to extract from the plurality of databases 206, such as an algorithm to extract data based on a type of siding or type of roof for each house (corresponding to each customer represented in the customer information). For example, the data analysis server 207 may extract data for homes with a type of siding or type of roof that is used for a majority of the customer's homes (e.g., wherein a majority is indicated by a value greater than or equal to 50% or another predefined percentage of the customer's homes). In yet another example, there may be more than two types of siding or roofing materials that are used for the customer's homes, and none of the types of siding or roofing materials may represent a majority of the customer's home. In this case, the data analysis server 207 may select a first type of siding or roofing material listed in at least one of databases 206, and use the selection for determining the one or more tips for customers' homes. Based on the data extracted by the data analysis server 207, the recommendation module 205 may determine and display home recommendations to customers accordingly. For example, the extracted data may be passed to the recommendation module 205 in a URL address, and the recommendation module 205 may match one or more parameters from the URL address to data by using a lookup table in order to determine which recommendations to generate for each specific customer.

In additional embodiments, the subsystems, application servers, and computing devices of the home recommendation subsystem 203 may also have access to the plurality of databases 206, as well as one or more application programming interfaces (APIs) which may provide public information and locality information for home recommendations.

In some embodiments, the data analysis server 207 may compile, store, and/or call a data lookup table for displaying one or more recommendations/tips for customers based on parameters passed by the email server 209. The recommendation module 205 may utilize the compiled and analyzed data (e.g., passed by the email server 209 as a uniform record locator (URL) address to the data) to identify one or more tips by parsing the one or more databases 206. For example, the recommendation module 205 may parse the syntax, fields, and/or format of data in the one or more databases 206. After parsing and identifying one or more tips, the recommendation module 205 may generate customized recommendations for the homes of users.

In additional embodiments, the recommendation system 202 may utilize the recommendation module 205 to provide facts, potential risks, and helpful tips to each user regarding his or her home. In an example, the recommendation system 202 may parse information and identify that house fires are common in a local area surrounding a user's home. Thus, the recommendation system 202 may provide information to the user regarding the historical costs for fire damage in the local area and generate a recommendation to the user to check and/or change the smoke detectors in his or her home every few months (e.g., every 3 months, every 6 months, or another interval of time).

In another example, the recommendation system 202 may parse information and identify that hail damages several homes in a user's neighborhood every year. The recommendation system 202 may determine that hail damage is the most common insurance claim in the user's neighborhood, and the recommendation system 202 may thus provide information to the user regarding the historical cost of insurance claims for hail damage. The recommendation system 202 may also recommend that the user consider upgrading to a hail-resistant roof to avoid costs associated with hail damage.

In another example, the recommendation system 202 may parse information and identify that wind damages several homes in a user's neighborhood every year. The recommendation system 202 may thus provide a recommendation to the user to consider installing window shutters because the user's home is at risk for wind damage.

In additional embodiments, the recommendation system 202 may identify the most common insurance claims and/or the most costly insurance claims in a local area, which may include damage from at least one of wind, water, hail, fire, theft, physical damage, freezing water (e.g., bursting pipes), lightning, liability insurance claims (e.g., slips and falls on a property, dog bites from a pet on a property, etc.), smoke, flooding, collision, spoilage, earth movements, earthquake, explosion, ice damage, mold, sprinkler leakage, vandalism, weight of ice or snow on a home, identification theft, contamination, accidental discharge/leakage, livestock, broken windows, sinkhole, building collapse, riot or civil commotion, In yet another example, the recommendation system 202 may estimate annual energy costs for powering the user's home based on the number of square feet of a home and based on historical data. The recommendation system 202 may provide a recommendation to a user to consider upgrading the user's home with energy efficient appliances to save money on energy costs. Furthermore, Table 1 (which is included herein) provides examples of various energy efficiency recommendations that the recommendation system 202 may provide to a user based on different data inputs.

Additionally, the recommendation system 202 may provide recommendations regarding certain exterior or indoor maintenance projects to the user, such as flushing a water heater, plumbing projects, fixing faucets, installing dishwashers, and the like. For example, the recommendation system 202 may determine that the current or upcoming weather is suitable (e.g., no rain) for working on an outdoor maintenance project, such as sealing a driveway or cleaning concrete. Thus, the recommendation system 202 may provide a recommendation to the user on what type of maintenance that the user can work on for his or her home in the upcoming days. Tables 2 and 3 (which are included herein) provide additional examples of recommendations related to weather, age, type of roof, and type of siding, in which the recommendations may be generated by the recommendation system 202 based on different data inputs. In addition to the examples listed in Tables 2 and 3, different types of a roof may include concrete tile, mission tile, Spanish tile, rubber, tin, steel, copper, wood shingles, New England pine shingles, Victorian scalloped shake, fiberglass panel, Plexiglas®, foam, architectural shingles, and the like. Different types of siding may also include logs, aluminum, vinyl, stucco on frame, stucco on block, brick veneer, solid brick, stone veneer, solid stone, adobe, block, window wall, cement fiber shingles, exterior insulation and finish, cement fiber, and the like. Furthermore, Table 4 (which is included herein) provides additional examples of recommendations related to one or more features of a customer's home, as well as outputs that are customized to include insurance agent information.

Figure 3:
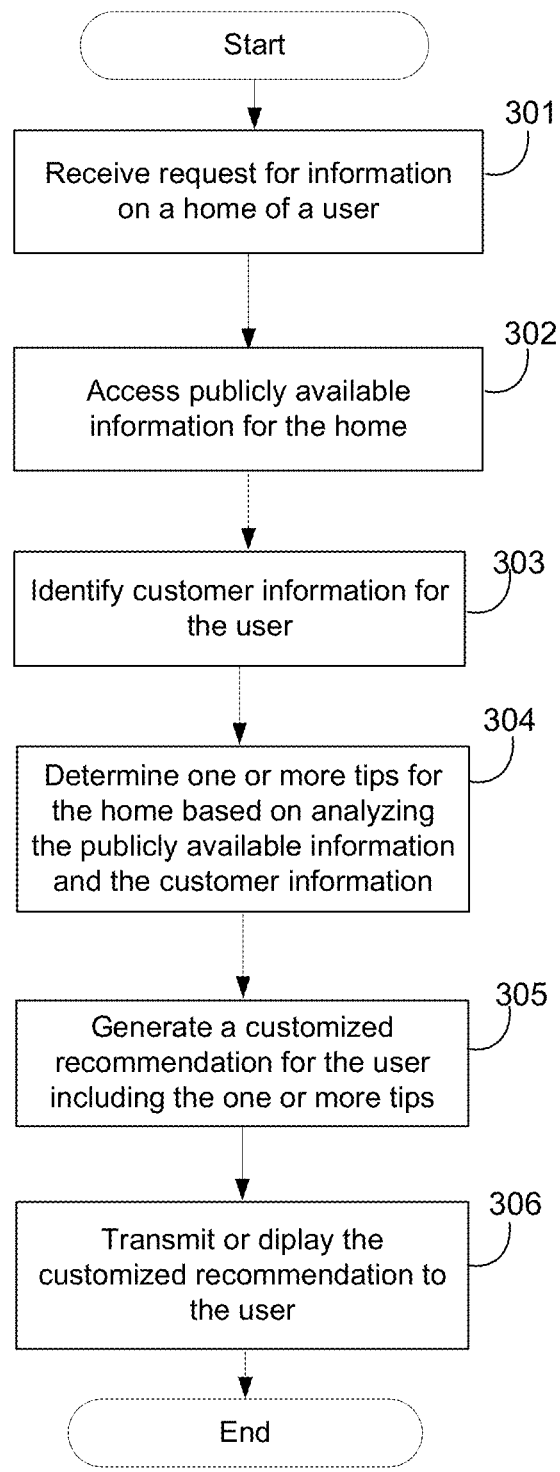
FIG. 3 depicts a flow diagram of example method steps for determining customized recommendations for home insurance and assessment in accordance with one or more example embodiments.

FIG. 3 illustrates a flow diagram of an example method in accordance with aspects of the present disclosure. In particular, FIG. 3 illustrates example method steps for determining customized recommendations for home assessment for users. The steps of FIG. 3 may be performed by subsystems, application servers, and computing devices of the home recommendation system 202 (e.g., recommendation subsystem 203, recommendation module 205, data analysis server 207, data server 208, and/or email server 209). One or more of the steps of FIG. 3 may be performed by executing a recommendation program (e.g., a home recommendation and assessment mobile application) and/or by operating a particularly configured computing device of the recommendation system 202. As a result of the method of FIG. 3, a user or customer, at recommendation device 212 (e.g., and/or at mobile device 220) may be provided with a customized recommendation for maintaining his or her home.

The method of FIG. 3 may begin with a step 301 of receiving a request for information on a home of a user. For example, the recommendation system 202 may receive a user request transmitted from the recommendation device 212 or the mobile device 220. In some embodiments, the user request may include a location of the user's home, such as an address and zip code of the home. In the request, the user may also specify the type of information in which the user is interested, such as maintenance information, common and costly insurance claim information, weather information, energy efficiency information, insurance agent information, third party vendor information, deals or discounts on products, and the like.

At step 302, the recommendation system may access publicly available information for the home. For example, the recommendation system 202 may access one or more databases 206 and parse publicly available information in the one or more databases 206 to identify and obtain a subset of information that is relevant to the user's particular home (e.g., based on the location or local area of the home). The publicly available information may include locality information, such as weather information, insurance claim history information, local crime statistics, cost of living information, energy information, market value information, and the like.

At step 303, the recommendation system may identify customer information for the user based on the request for information on the home. For example, the recommendation system 202 may access and parse one or more records in the databases 206 to identify customer information comprising information about one or more features of the user's home and types of materials used in the home. In some embodiments, the customer information may indicate features of the home, such as electrical systems, furnishings, plumbing fixtures and equipment, security systems, carpentry, windows, floors, and the like. In additional embodiments, the customer information may also indicate whether a home has added features, such as a balcony, terrace, pool, deck, patio, porch, garage, and the like.

At step 304, the recommendation system may determine one or more tips for the user's home based on parsing and analyzing the customer information and the publicly available information. For example, the recommendation system 202 may utilize the data analysis server 207 to parse and analyze the compiled data using one or more predefined algorithms. Based on the parsing and analysis from the data analysis server 207, the recommendation module 205 of the recommendation system 202 may identify one or more tips for the user's home. For example, the one or more tips for the home may be related to at least one of maintenance, renovation, part replacement, cost savings, energy efficient savings, and the like for the home.

At step 305, the recommendation system may generate a customized recommendation for the user including the one or more tips for the home. For example, the recommendation system 202 may provide a recommendation including the one or more tips for the home to the user. The recommendation may indicate one or more methods that the user can save money, such as by purchasing energy efficient appliances, as well as incentives and offers from third-party vendors. At step 306, the recommendation system may transmit the customized recommendation to the user. For example, the recommendation system 202 may transmit a notification regarding the customized recommendation regarding the home to a recommendation device 212 or a mobile device 220 associated with the user, such as by transmitting the customized recommendation to be displayed/output on a display of the recommendation device 212 or the mobile device 220. In some cases, the recommendation system 202 may transmit the customized recommendation to the recommendation device 212 or mobile device 220, and a web browser installed on the recommendation device 212 or mobile device 220 may display the customized recommendation to the user.

Figure 4:
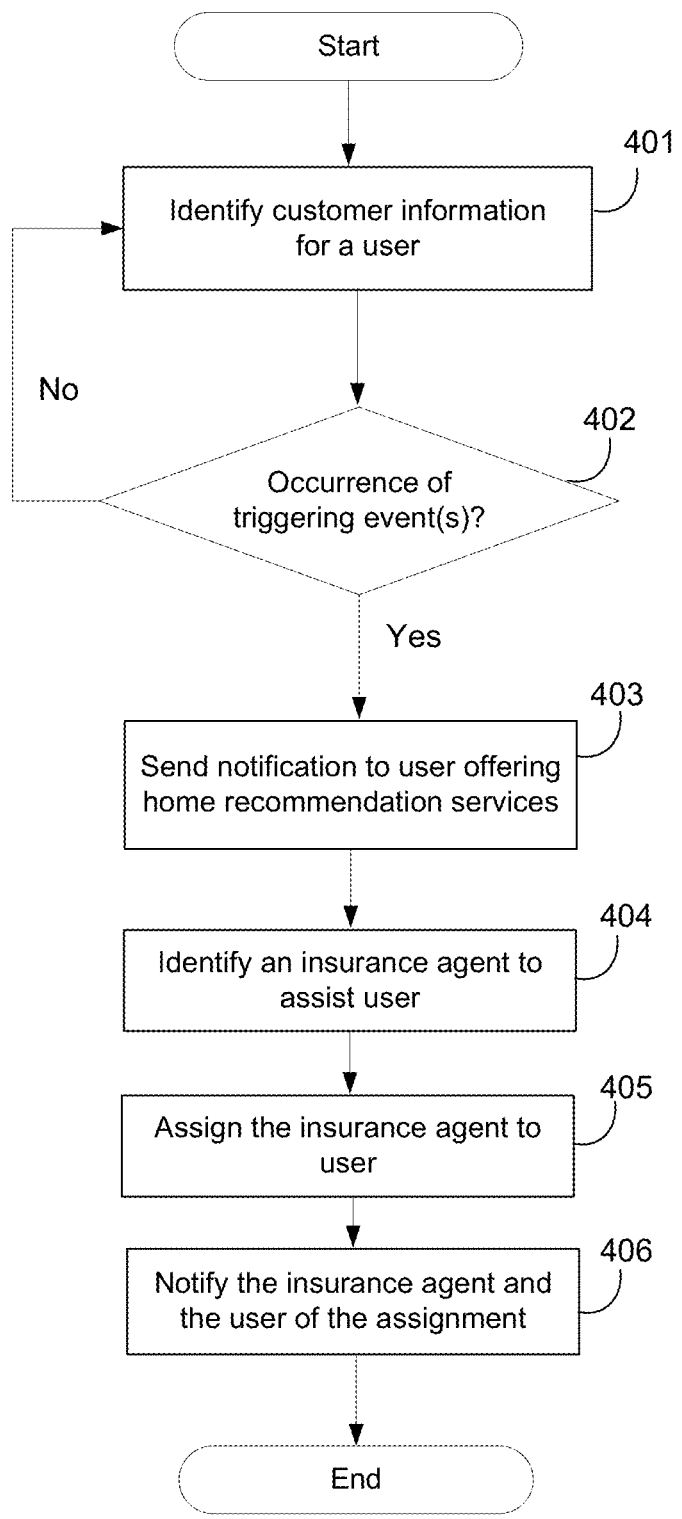
FIG. 4 depicts a flow diagram of example method steps for identifying triggering events for customers, offering home recommendation services to customers, and assigning insurance agents to customers in accordance with one or more example embodiments.

FIG. 4 illustrates a flow diagram of an example method in accordance with aspects of the present disclosure. In particular, FIG. 4 illustrates example method steps for providing customized recommendation services to users. The steps of FIG. 4 may be performed by subsystems, application servers, and computing devices of the home recommendation system 202 (e.g., recommendation subsystem 203, recommendation module 205, or data analysis server 207, data server 208, and/or email server 209). One or more of the steps of FIG. 4 may be performed by executing a recommendation program (e.g., a home recommendation and assessment mobile application) and/or by operating a particularly configured computing device of the recommendation system 202. As a result of the method of FIG. 4, a user or customer, at recommendation device 212 (e.g., and/or at mobile device 220) may be offered home recommendation services for maintaining his or her home, as well as assigned an insurance agent for assistance.

The method of FIG. 4 may begin with a step 401 of identifying customer information for a user or a customer. For example, the recommendation system 202 may monitor (e.g., continuously monitor, in real-time or near real-time) a customer's account information (e.g., stored in one or more databases 206) to determine if there are any changes in the customer's account. At step 402, the recommendation system may determine whether or not one or more triggering events have occurred for the customer. For example, the recommendation system 202 may identify if there are any triggering events for the customer based on monitoring the customer's account. For example, a triggering event may indicate a certain event of a customer or a change in a customer's account, such as a customer getting married, an address change, a change in a mortgagee (e.g., a bank or entity that is lending money to a customer for purchasing a home), and the like. In some embodiments, a triggering event may include a new customer reaching a certain number of days on an insurance policy. For example, new customers may reach a predefined number of days (e.g., 30 days, 60 days, 90 or the like) in a new insurance policy, which may be a triggering event. That is, the recommendation system 202 may determine that a customer has reached the predefined number of days in a new insurance policy and identify this milestone as a triggering event.

If one or more triggering events have not occurred for the customer, then the method in this example may return to step 401, at which the recommendation system 202 may continue to monitor customer information for the user. The recommendation system 202 may continue monitoring the customer information until the system 202 determines that a triggering event has occurred for the user based on a change in the customer information.

If one or more triggering events have occurred for the customer, then the method in this example proceeds to step 403. In alternative arrangements, steps 401 and 402 of FIG. 4 may be performed by the email server 209, whereas steps 403-406 of FIG. 4 may be performed by the home recommendation system 202. At step 403, the recommendation system may send a notification to the customer offering home recommendation services. For example, the recommendation system 202 may send a notification to at least one of a mobile device 220 or recommendation device of 212 of a customer, wherein the notification may indicate that the customer is eligible for customized home assessment and/or home recommendation services. In some embodiments, the customer may be notified by at least one of email, text messages (e.g., SMS, MMS, and the like), push notifications, voicemail, and phone calls on his or her mobile device (e.g., mobile device 220). In additional embodiments, the notification sent to the customer may be for a new customer or a prospective customer who is considering purchasing home insurance from a new insurance provider.

At step 404, the recommendation system may identify an insurance agent who is available to assist the user. For example, the recommendation system 202 may determine that there is an insurance agent who is available to offer assistance to the user by checking one or more databases 206 to identify real-time insurance agent availability. After identifying the insurance agent, at step 405, the recommendation system may assign the insurance agent to the user. For example, the recommendation system 202 may create and store a record in one or more databases 206, in which the record indicates that a particular insurance agent has been assigned to assist the user, At step 406, the recommendation system may notify the insurance agent and the user of the assignment. For example, the recommendation system 202 may transmit a notification regarding the assigned insurance agent to the recommendation device 212 or a mobile device 220 associated with the user. The recommendation system 202 may also simultaneously (at or around the same time) transmit a notification regarding the assignment to a computing device 217 associated with the insurance agent. As a result of the assignment, the insurance agent may be able to provide assistance, home insurance, and maintenance information to the user, including information regarding insurance quotes, deals, incentives, and the like.

In some cases, the customer may be a prospective customer interested in home insurance or home recommendation services. The home recommendation system 202 may provide a recommendation to the customer, along with a list of multiple insurance agents who are available to assist the customer. The customer may then select an insurance agent from the list of multiple insurance agents and contact the selected insurance agent directly for more information.

Figure 5B:
FIGS. 5A and 5B depict an illustrative diagram of example user interfaces of a home recommendation application in accordance with one or more example embodiments.
Figure 5A:
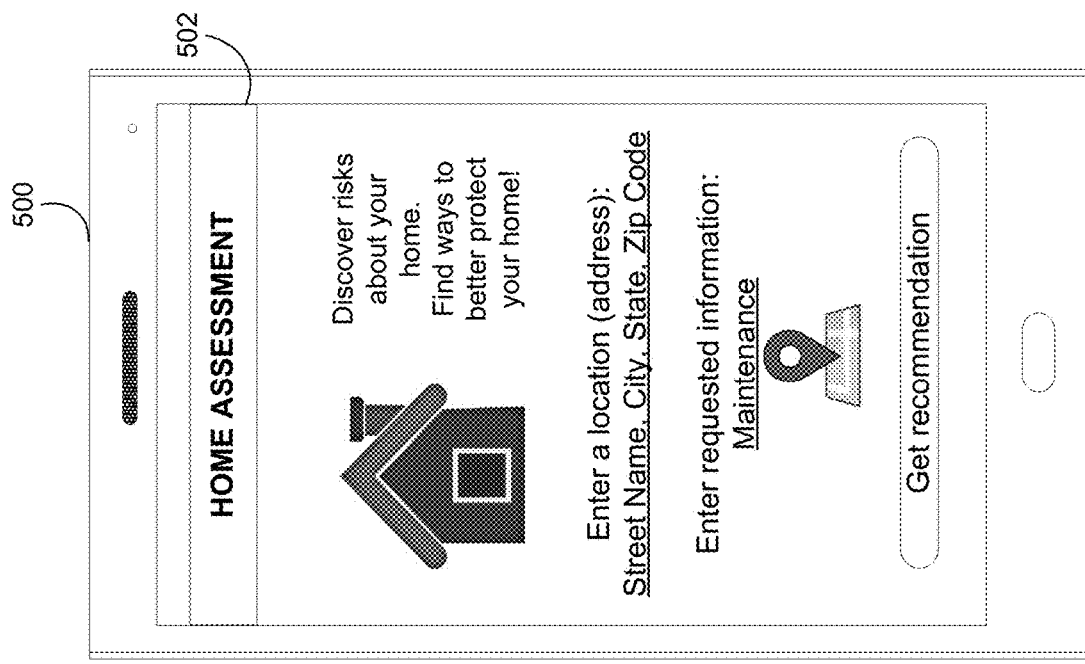

FIGS. 5A and 5B each depict an illustrative diagram of example user interfaces of a home recommendation application 502 operating on a recommendation device 500 in accordance with aspects of the present disclosure. The example user interfaces may be presented on a display of a computing device, such as display 214 of recommendation device 212, on a mobile device such as mobile device 220 in FIG. 2, or the like. A user or customer associated with a home may access a recommendation application 502 using a recommendation device 500 (e.g., at least one of recommendation device 212 or mobile device 220). Specifically, FIGS. 5A and 5B illustrate example user interfaces of utilizing a recommendation application 502 to view and manage home assessment and recommendation services.

The user interface in FIG. 5A depicts an example of a user interface that the recommendation application 502 may display to a user after the user accesses the recommendation application 502 on his or her device. In some embodiments, the user may utilize the recommendation application 502 to enter the location of his or home (e.g., an address) and submit a request for information on the home. In additional embodiments, the user may be able to identify what type of information he or she is interested in specifically. For example, the user may request information regarding maintenance of his or her home. In other examples, the user may request one or more tips regarding renovation, part or device replacements (e.g., replacing the air conditioning unit or another unit in the home), cost savings, energy efficiency savings, vendor offers, insurance information, and the like. The user may select the "Get recommendation" option to submit his or her request to the recommendation application 502.

The user interface in FIG. 5B depicts an example of a user interface that the recommendation application 502 may present to the user or customer after the recommendation system has analyzed customer information and publicly available information to determine one or more tips for the user's home. For example, the recommendation application 502 may identify a market value of the user's home, as well as locality information (e.g., publicly available information) of where the home is located. In some cases, the recommendation application 502 may identify weather information, population of the local area, number of square feet of the home, the year the home was built, the number of bedrooms and bathrooms in the home, and the like. The recommendation application 502 may further identify the most common claims in the local area, the cost of the most costly claims in the local area, and one or more property features of the user's home. Based on analyzing the customer information and the publicly available information, the recommendation application 502 may determine a customized recommendation for the user including one or more tips for maintaining the user's home. The customized recommendation may include maintenance tips, energy saving tips, deals for specific home-related products, discounts on insurance, offers from third-party vendors, and the like. In some cases, the recommendation application 502 may also provide a personalized summary to the user based on the analysis of data performed by the recommendation system (e.g., recommendation system 202).

In additional embodiments, the recommendation application 502 may provide various user interfaces to a user depending on if the user is a new homeowner or if the user is renewing a home insurance policy or switching to a new insurance provider or the like. Table 5 (which is included herein) provides additional examples of varying outputs the recommendation application 502 may display to the user based on different data inputs.

Although several aspects described herein are related to home structures and home owners, aspects of the disclosure may be used to generate customized recommendations for any type of structure and/or any type of user (e.g., renter, or the like) without departing from the invention.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

Tables

TABLE 1

Examples of Energy Efficiency Recommendations

| Input | Output |
|---|---|
| Home Energy Saver data | Your average energy costs are $XXXX/yr. There are many steps you could take to lower your annual energy costs (based on averages in your ZIP code). Learn how energy-efficient appliances can lower your costs and use the information below to identify more ways energy-efficient upgrades can help you save. |
| No Home Energy data | You could lower your yearly energy costs. There are many steps you could take to lower your annual energy costs. Learn how energy-efficient appliances can lower your costs and use the information below to identify more ways energy-efficient upgrades can help you save. |
| Data regarding offer from a third-party vendor | Save on appliance protection. Protect covered systems and appliances from costly repairs. Plus, save on new energy efficient appliances with the 123 Appliance Discount Program. Save $X on 123 warranty plan from Vendor A. |

TABLE 2

Examples of Weather-Related Recommendations

| Input | | Output |
|---|---|---|
| Weather condition: Clear Temperature: 70° and above Age of home: 7 yrs. old and above | Today, it's XX° and clear. | Because the sun can fade your home's exterior, consider painting it every 7-12 years[2] and learn to <a href="//goodhome.com/protect-your-home-from-elements/" target="_blank">protect your home from the elements</a>. |
| Weather condition: Clear Temperature: 70° and above Age of home: Under 7 yrs. old | Today, it's XX° and clear. | Because the sun can fade your home's exterior, consider touching up the paint every year[3] and learn to <a href="//goodhome.com/protect-your-home-from-elements/" target="_blank">protect your home from the elements</a>. |
| Weather condition: Clear Temperature: Under 70° Age of home: Any age | Today, it's XX° and clear. | Because your home is exposed to the elements, learn to <a href="//goodhome.com/protect-your-home-from-elements/" target="_blank">inspect your home's foundation</a> to spot signs of early foundation damage. |
| Weather condition: Rainy Temperature: Any temperature Age of home: 20 yrs. old and above | Today, it's XX° and raining. | Because rain may be a risk to your home, consider replacing your rain gutters about every 20 years[4] and learn to <a href="//goodhome.com/goodhome/reduce-rain-related-water-damage/" target="_blank">reduce rain-related water damage</a>. |
| Weather condition: Rainy Temperature: Any temperature Age of home: Under 20 yrs. old | Today, it's XX° and raining. | Because rain may be a risk to your home, consider cleaning your rain gutters regularly and learn to <a href="//goodhome.com/goodhome/reduce-rain-related-water-damage/" target="_blank">reduce rain-related water damage</a>. |
| Weather condition: Cloudy Temperature: Any temperature Age of home: Any age | Today, it's XX° and cloudy. | Because cloudy days are great days for indoor maintenance, <a href="//goodhome.com/goodhome/take-care-of-your-water-heater/" target="_blank">learn about water heater maintenance</a> and consider flushing it. |
| Weather condition: Snowing Temperature: Any temperature Age of home: 15 yrs. old and above | Today, it's XX° and snowing. | Because snow may be a risk for your home, consider replacing your roof every 15-20 years[5] and <a href="//goodhome.com/goodhome/take-care-of-your-water-heater/" target="_blank">learn to inspect it</a>. |
| Weather Condition: Snowing Temperature: Any temperature Age of home: Under 15 yrs. old | Today, it's XX° and snowing. | Because snow may be a risk for your home, <a href="//goodhome.com/goodhome/inspect-your-roof-for-damage/" target="_blank">learn to inspect your roof</a> and do it regularly. |
| Weather condition: Clear Temperature: 70° and above NO HOME AGE | Today, it's XX° and clear. | Because the sun can fade your home's exterior, consider touching up the paint every year and <a href="//goodhome.com/protect-your-home-from-elements/" target="_blank">protect your home from the elements</a>. |

TABLE 2-continued

Examples of Weather-Related Recommendations

| Input | | Output |
|---|---|---|
| Weather condition: Clear Temperature: Under 70° NO HOME AGE | Today, it's XX° and clear. | Because your home is exposed to the elements, learn to <a href="//goodhome.com/goodhome/inspect-your-homes-foundation/" target="_blank">inspect your home's foundation</a> to spot signs of early foundation damage. |
| Weather condition: Rainy Temperature: Any temperature NO HOME AGE | Today, it's XX° and raining. | Because rain may be a risk to your home, consider cleaning your rain gutters regularly and learn to <a href="//goodhome.com/goodhome/reduce-rain-related-water-damage/reduce rain-related water damage</a>. |
| Weather condition: Cloudy Temperature: Any temperature NO HOME AGE | Today, it's XX° and cloudy. | Because cloudy days are great days for indoor maintenance, <a href="//goodhome.com/goodhome/reduce-rain-related-water-damage/" target="_blank">learn about water heater maintenance</a> and consider flushing it. |
| Weather Condition: Snowing Temperature: Any temperature NO HOME AGE | Today, it's XX° and snowing. | Because snow may be a risk for your home, <a href="//goodhome.com/goodhome/inspect-your-roof-for-damage/" target="_blank">learn to inspect your roof</a> and do it regularly. |
| NO WEATHER DATA NO HOME AGE | Regularly inspect your home. | Because your home is exposed to the elements, learn to <a href="//goodhome.com/goodhome/reduce-rain-related-water-damage/" target="_blank">inspect your home's foundation</a> to spot signs of early foundation damage. |
| Region/State: Maine New Hampshire Vermont New York Massachusetts Rhode Island Connecticut Pennsylvania New Jersey Delaware Maryland Washington DC Virginia North Carolina South Carolina Georgia Florida | | Prepare for hurricanes in City name Keep a three-day supply of canned food on hand. Get a battery-powered flashlight and radio. Landscape with salt-tolerant plants and soft mulch. Know your hurricane evacuation route. Store important documents in a waterproof safe. Create your family's evacuation plan |
| Region/State: Ohio West Virginia Kentucky Tennessee Alabama Mississippi Louisiana Michigan Indiana Illinois Wisconsin Missouri Arkansas Oklahoma Texas Kansas Nebraska | | Prepare for tornadoes in City name Keep a first aid kit and non-perishable food on hand. Have a battery-powered flashlight and radio available. Know where to seek shelter, like in your basement. Choose a place to meet in case your family is separated. Landscape with soft bark instead of rock and gravel. Create your family's evacuation plan |

TABLE 2-continued

Examples of Weather-Related Recommendations

| Input | Output |
|---|---|
| Iowa | |
| Minnesota | |
| North Dakota | |
| South Dakota | |
| Montana | |
| Wyoming | |
| Colorado | |
| New Mexico | |
| Montana | |
| Region/State: | Prepare for earthquakes in City name |
| Idaho | Secure heavy furniture to the wall. |
| Utah | Invest in a battery-powered flashlight and radio. |
| Arizona | Keep a first aid kit and non-perishable food on hand. |
| Nevada | Know how to shut off your water, gas and electricity. |
| California | Purchase a multipurpose dry chemical fire extinguisher. |
| Oregon | Create your family's evacuation plan |
| Washington | |
| Alaska | |
| Hawaii | |

TABLE 3

Examples of Recommendations related to Age and Types of Roofing and Siding

| Input | Output |
|---|---|
| New homeowner, policy renewal, carrier switch customer home age | Your home is 25 years old. As your home ages, regular maintenance can help keep it in good shape, and Maintenance Reminders can help you remember important tasks. |
| Prospect home age | Your home is 25 years old. As your home ages, regular maintenance can help keep it in good shape. Remember to take care of your home so that it can help take care of you and your family. Maintenance Reminders can help you remember important tasks. Get started |
| Header if no home age is available | Your home is getting older. |
| New homeowner, policy renewal, carrier switch customer data: Asphalt/fiberglass shingles | Roof type: Asphalt/fiberglass shingles Keeping your roof free of debris can help prevent damage. |
| New homeowner, policy renewal, carrier switch customer data: Wood shake | Roof type: Wood shake Keeping your roof free of debris can help prevent damage. |
| New homeowner, policy renewal, carrier switch customer data: Slate | Roof type: Slate Keeping your roof free of debris can help prevent damage. |
| New homeowner, policy renewal, carrier switch customer data: Tar and gravel | Roof type: Tar and gravel Keeping your roof free of debris can help prevent damage. |
| New homeowner, policy renewal, carrier switch customer data: Clay tile | Roof type: Clay tile Keep your roof free of debris to help prevent damage. |
| New homeowner, policy renewal, carrier switch customer data: no roof data | Roof maintenance Keeping your roof free of debris can help prevent damage. |
| New homeowner, policy renewal, carrier switch customer data: Clapboard | Siding type: Clapboard Regularly inspect your home's exterior for wear and tear. |
| New homeowner, policy renewal, carrier switch customer data: Wood | Siding type: Wood Regularly inspect your home's exterior for wear and tear. |
| New homeowner, policy renewal, carrier switch customer data: Wood shakes | Siding type: Wood shakes Regularly inspect your home's exterior for wear and tear. |
| New homeowner, policy renewal, carrier switch customer data: T-111 | Siding type: T-111 Regularly inspect your home's exterior for wear and tear. |
| New homeowner, policy renewal, carrier switch customer data: Logs | Siding type: Logs Regularly inspect your home's exterior for wear and tear. |
| New homeowner, policy renewal, carrier switch customer data: No siding data | Home exterior maintenance Regularly inspect your home's exterior for wear and tear. |

TABLE 4

Examples of Additional Recommendations

| Input | Output |
|---|---|
| Customer name | Jane's Home Helpers Explore handy home resources. Different home features may require different types of maintenance and safety precautions. Select the features in your home to get customized information about how to help protect each of them. Select your home's features: |
| Basement Group Code: 2 - Raised Basement Group Code: 3 - Unfinished Basement Group Code: 4 - Partial Finished Basement Group Code: 5 - Finished | Protect your basement from sewer backup |
| Fireplace - Single Fireplace - Double Fireplace - Triple Fireplace - 0 Clearance Gas Fireplace Fireplace (M-MH) | Tips to keep your chimney safe |
| Swim Pool - Concrete (Small) Swim Pool - Concrete (Medium) Swim Pool - Concrete (Large) Screened Pool Enclosure | Swimming pool safety tips |
| Attached Garage - 1 Car Attached Garage - 2 Car Attached Garage - 3 Car | How to avoid hidden garage dangers |

TABLE 4-continued

Examples of Additional Recommendations

| Input | Output |
|---|---|
| Built-in Garage - 1 Car | |
| Built-in Garage - 2 Car | |
| Built-in Garage - 3 Car | |
| Basement Garage - 1 Car | |
| Basement Garage - 2 Car | |
| Basement Garage - 3 Car | |
| Detached Garage - 1 Car | |
| Detached Garage - 2 Car | |
| Detached Garage - 3 Car | |
| Det. Gar. W/Fin. Area - 1 Car | |
| Det. Gar. W/Fin. Area - 2 Car | |
| Det. Gar. W/Fin. Area - 3 Car | |
| Wood Deck | Backyard deck safety |
| Redwood Deck | |
| Composite Deck | |
| Heating System - Average Cost | Keep your HVAC system in shape |
| Central Air Conditioning - Avg Cost | |
| Heat & Central Air Cond.- Avg Cost | |
| Heating - Electric | |
| Heating - Gas | |
| Heating - Oil | |
| Heating - Gas Hot Air | |
| Heating - Gas Hot Water | |
| Heating - Oil Hot Air | |
| Heating - Oil Hot Water | |
| Heating - Oil Hot Water With Radiators | |
| Heating - Propane Gas Hot Air | |
| Heating - Propane Gas Hot Water | |
| Central Air Cond.- Same Ducts | |
| Central Air Cond.- Separate Ducts | |
| Additional Furnace | |
| Central Burglar Alarm System | Reduce false alarms and stay protected |
| Insurance Agent Note: New Homeowner | Are you covered for that? Email me, and I can explain the coverage types on your policy. |
| Insurance Agent Note: New Homeowner: | Are you covered for that? Call me, and I can explain the coverage types on your policy. |
| Insurance Agent Note: Policy Renewal: | Are you protected? Email me, and I can help you review and adjust the coverage on your policy. |

TABLE 5

Examples of Outputs for Recommendation System User Interface

| Input | Output |
|---|---|
| New Homeowner | Welcome Jane, As a new homeowner, GoodHome can help you find new ways to keep your home protected. Congratulations on purchasing a new home. Your GoodHome results can help you: Find ways to protect your new home Access special offers Ask me questions about your coverage |
| Policy Renewal | Welcome Jane, It's almost time to renew your homeowners policy. See how GoodHome can help you find new ways to protect your home. Your GoodHome results can help you: Find new ways to stay protected Access exclusive savings Talk to me about your coverage |
| Carrier Switch | Welcome Jane, Thanks for switching to us and choosing Homeowners insurance. See how GoodHome can help you find new ways to protect your home. |
| Default Customer | Welcome Jane, Thank you for being a customer. See how GoodHome can help you find new ways to protect your home. |
| Intro if no customer name is available | Welcome |

What is claimed is:

1. A server device comprising:
at least one processor; and
a memory storing computer-readable instructions that, when executed by the at least one processor, cause the server device to:
automatically identify a home location of a home based on global positioning system (GPS) coordinates indicating a geographical location of a computing device associated with a user of the home location;
generate and send a uniform resource locator (URL) address in a message to the computing device, wherein the URL address comprises one or more parameters based on the home location;
receive, from the computing device, a request for a customized recommendation based on a selection of the URL address;
parse, based on the request, one or more databases by matching the one or more parameters included in the URL address to one or more variables in the one or more databases;
identify, based on the parsing the one or more databases, one or more types of insurance claims having costs exceeding a threshold amount for homes located within a predetermined distance of the home;
generate, based on the identified one or more types of insurance claims, the customized recommendation, wherein the customized recommendation comprises one or more tips related to the home; and
cause to display, at the computing device, the customized recommendation.

2. The server device of claim 1, wherein the instructions, when executed by the at least one processor, further cause the server device to:
assign, based on a location of the home indicated in the one or more parameters, an insurance agent the user.

3. The server device of claim 1, wherein the one or more databases comprise publicly available information comprising at least one of: information about a location or neighborhood in which the home is located, weather information related to the location or neighborhood, insurance claim history associated with the home, insurance claim history associated with other homes in the location or neighborhood, crime statistics associated with the location or neighborhood, cost of living information associated with the location or neighborhood, energy information associated with the home, energy information associated with the other homes, market value information associated with the home, and market value information associated with the other homes.

4. The server device of claim 1, wherein the one or more parameters comprise one or more features of the home comprising at least one of: a pool, a deck, a balcony, a terrace, a patio, a porch, a garage, an exterior addition, lights, floors, water pipes, a heater, an air conditioner, a refrigerator, and materials used in the home.

5. The server device of claim 1, wherein the one or more tips for the home are related to at least one of maintenance, renovation, part replacement, cost savings, and energy efficient savings for one or more features of the home.

6. The server device of claim 1, further comprising:
determining the one or more tips based on matching the one or more parameters with the one or more variables, in a data lookup table, corresponding to the one or more tips.

7. A method comprising:
automatically identifying a home location of a home based on global positioning system (GPS) coordinates indicating a geographical location of a computing device associated with a user of the home location;
generating and sending a uniform resource locator (URL) address in a message to the computing device, wherein the URL address comprises one or more parameters based on the home location;
receiving, from the computing device, a request for a customized recommendation based on a selection of the URL address;
parsing, based on the request, one or more databases by matching the one or more parameters included in the URL address to one or more variables in the one or more databases;
identifying, based on the parsing the one or more databases, one or more types of insurance claims having costs exceeding a threshold amount for homes located within a predetermined distance of the home;
generating, based on the identified one or more types of insurance claims, the customized recommendation, wherein the customized recommendation comprises one or more tips related to the home; and
causing to display, at the computing device, the customized recommendation.

8. The method of claim 7, further comprising:
assigning, based on a location of the home indicated in the one or more parameters, an insurance agent to the user.

9. The method of claim 7, wherein the one or more parameters comprise one or more features of the home comprising at least one of: a pool, a deck, a balcony, a terrace, a patio, a porch, a garage, exterior additions, lights, floors, water pipes, a heater, an air conditioner, a refrigerator, and materials used in the home.

10. The method of claim 7, wherein the one or more tips for the home are related to at least one of: maintenance, renovation, or part replacement of one or more features of the home indicated in the one or more parameters.

11. The method of claim 7, further comprising:
determining, based on a location of the home indicated in the one or more parameters, weather information for a predetermined period of time; and
determining, based on the weather information for the predetermined period of time, a time for performing maintenance, renovation, or part replacement of one or more features of the home indicated in the one or more parameters,
wherein the customized recommendation comprises a recommendation of the time for performing the maintenance, renovation, or part replacement.

12. The method of claim 7, wherein the one or more tips comprise one or more tips for avoiding incurring costs associated with the identified one or more types of insurance claims.

13. A non-transitory computer-readable medium comprising instructions stored thereon, when executed the instructions are effective to cause a system to:
automatically identifying a home location of a home based on global positioning system (GPS) coordinates indicating a geographical location of a computing device associated with a user of the home location;
sending a uniform resource locator (URL) address in a message to the computing device, wherein the URL address comprises one or more parameters based on the home location;
receiving, from the computing device, a request for a customized recommendation based on a selection of the URL address;
parsing, based on the request, one or more databases by matching the one or more parameters included in the URL address to one or more variables in the one or more databases;
identifying, based on the parsing the one or more databases, one or more types of insurance claims having costs exceeding a threshold amount for homes located within a predetermined distance of the home;
generating, based on the identified one or more types of insurance claims, the customized recommendation, wherein the customized recommendation comprises one or more tips related to the home; and
causing to display, at the computing device, the customized recommendation.

14. The non-transitory computer-readable medium of claim 13, wherein the instructions are effective to further cause the system to:
assigning, based on a location of the home indicated in the one or more parameters, an insurance agent to the user.

15. The non-transitory computer-readable medium of claim 13, wherein the one or more parameters comprise one or more features of the home comprising at least one of: a pool, a deck, a balcony, a terrace, a patio, a porch, a garage, exterior additions, lights, floors, water pipes, a heater, an air conditioner, a refrigerator, and materials used in the home.

16. The non-transitory computer-readable medium of claim 13, wherein the one or more tips for the home are related to at least one of: maintenance, renovation, or part replacement of one or more features of the home indicated in the one or more parameters.

17. The non-transitory computer-readable medium of claim 13, wherein the instructions are effective to further cause the system to:
determining, based on a location of the home indicated in the one or more parameters, weather information for a predetermined period of time; and
determining, based on the weather information for the predetermined period of time, a time for performing maintenance, renovation, or part replacement of one or more features of the home indicated in the one or more parameters,
wherein the customized recommendation comprises a recommendation of the time for performing the maintenance, renovation, or part replacement.

18. The non-transitory computer-readable medium of claim 13, wherein the one or more tips comprise one or more tips for avoiding incurring costs associated with the identified one or more types of insurance claims.

19. The non-transitory computer-readable medium of claim 13, wherein the instructions are effective to further cause the system to:

assign, based on a location of the home indicated in the one or more parameters, an insurance agent the user.

20. The non-transitory computer-readable medium of claim 13, wherein the one or more databases comprise publicly available information comprising at least one of: information about a location or neighborhood in which the home is located, weather information related to the location or neighborhood, insurance claim history associated with the home, insurance claim history associated with other homes in the location or neighborhood, crime statistics associated with the location or neighborhood, cost of living information associated with the location or neighborhood, energy information associated with the home, energy information associated with the other homes, market value information associated with the home, and market value information associated with the other homes.

* * * * *